No. 881,732. PATENTED MAR. 10, 1908.
G. W. SPENCE.
TRAP NEST.
APPLICATION FILED MAR. 21, 1907.
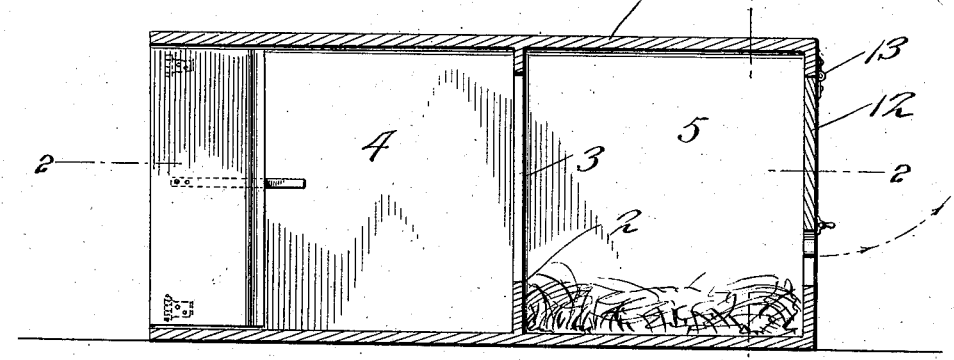
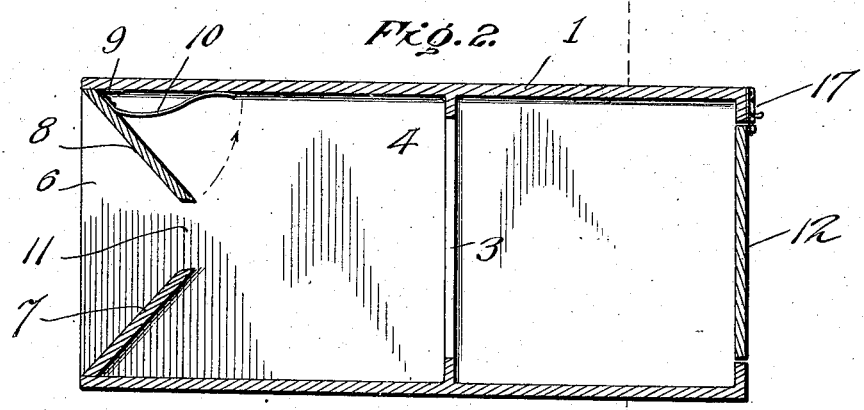
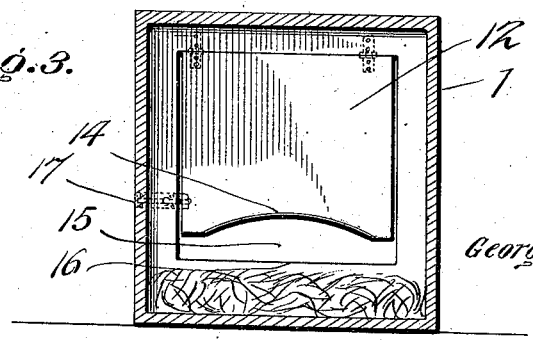
Inventor
George W. Spence,
Witnesses
By Victor J. Evans
Attorney

UNITED STATES PATENT OFFICE.

GEORGE W. SPENCE, OF TULLY, NEW YORK.

TRAP-NEST.

No. 881,732.  Specification of Letters Patent.  Patented March 10, 1908.

Application filed March 21, 1907. Serial No. 363,695.

*To all whom it may concern:*

Be it known that I, GEORGE W. SPENCE, a citizen of the United States of America, residing at Tully, in the county of Onondaga and State of New York, have invented new and useful Improvements in Trap - Nests, of which the following is a specification.

This invention relates to trap nests for poultry, and one of the principal objects of the same is to provide a trap nest with means which will permit a hen to enter at one end and emerge from the other end in order that the laying hens may be separated from the others when the exit end of the trap nest is disposed within an inclosure, while the outer end is open to permit laying hens to pass in to the trap nest.

Another object of the invention is to provide a simple trap nest which will permit the entrance of one hen at a time, and will not permit the hen to make an exit through the entrance end of the trap nest.

These and other objects may be attained by means of the construction illustrated in the accompanying drawing, in which:

Figure 1 is a central longitudinal vertical section of a trap nest made in accordance with my invention. Fig. 2 is a horizontal longitudinal section on the line 2—2, Fig. 1. Fig. 3 is a vertical section on the line 3—3, Fig. 1.

Referring to the drawing for a more particular description of my invention, the numeral 1 designates a box, the bottom and sides of which are closed, said box being provided with a partition 2 provided with an opening 3 of sufficient size to permit a hen to pass from the compartment 4 to the nest compartment 5. In the entrance end 6 of the box, a door is provided comprising a stationary member 7 extending inwardly and toward the center of the box, and a hinged member 8 connected by hinges 9 to one side of the box and provided with a spring 10, said spring being secured to the member 8 and bearing near its opposite end against the inner wall of the box, there being a space 11 between the members 7 and 8 to permit a hen to peer into the box, the spring 10 being of just sufficient strength to throw the member out into the position shown in Fig. 2. At the opposite end of the box or trap, a door 12 is hinged at 13, to swing outwardly, said door being cut away at its lower edge, as at 14 to afford a sight opening 15 between the lower edge of the door and the bottom edge 16 of the door frame. A suitable bolt 17 may be secured to the door frame for holding the door 12 closed whenever required.

In operation the trap nest is disposed with its inner ends within an inclosure *a* shown in dotted lines in Fig. 2. A hen passing into the nest through the opening 11, and into the nest chamber 5 after an egg has been laid, will effect an exit through the door 12, which automatically closes after she has passed out. Thus the laying hens are confined within the the closure *a*. Should it be found necessary to ascertain and separate the various breeds that are laying at a given time, the door 12 may be locked by the bolt 17 and opened at such intervals as will indicate which particular hen has entered the trap nest.

From the foregoing it will be obvious that a trap nest made in accordance with my invention is of simple construction, will operate efficiently for its purpose, may be made at slight cost, and will not readily get out of order.

Having thus described the invention, what I claim is:

A trap nest for poultry comprising a box provided with a door comprising a rigid member and a spring actuated member movable inward in the box, said members converging and spaced apart, a partition in the box having an opening therein, said partition dividing the box into two compartments, and a hinged door, said door being hinged at its upper side to drop by gravity and close the opening, said door having a recess at its lower end, substantially as described.

In testimony whereof, I affix my signature in presence of two witnesses.

GEORGE W. SPENCE.

Witnesses:
H. H. HURLBUT,
C. B. RUSSELL.